United States Patent
Bethouart

(10) Patent No.: US 12,460,108 B2
(45) Date of Patent: Nov. 4, 2025

(54) GLUE STICK COMPOSITION

(71) Applicant: Société BIC, Clichy (FR)

(72) Inventor: Carine Bethouart, Clichy (FR)

(73) Assignee: Société BIC, Clichy (FR)

( * ) Notice: Subject to any disclaimer, the term of this patent is extended or adjusted under 35 U.S.C. 154(b) by 606 days.

(21) Appl. No.: 17/603,760

(22) PCT Filed: Apr. 10, 2020

(86) PCT No.: PCT/EP2020/060355
§ 371 (c)(1),
(2) Date: Oct. 14, 2021

(87) PCT Pub. No.: WO2020/212291
PCT Pub. Date: Oct. 22, 2020

(65) Prior Publication Data
US 2022/0177746 A1    Jun. 9, 2022

(30) Foreign Application Priority Data

Apr. 16, 2019  (EP) .................................... 19305493

(51) Int. Cl.
*C09J 9/00* (2006.01)
*C09J 11/08* (2006.01)
*C09J 103/02* (2006.01)

(52) U.S. Cl.
CPC .............. *C09J 9/005* (2013.01); *C09J 11/08* (2013.01); *C09J 103/02* (2013.01); *C09J 2401/00* (2013.01); *C09J 2403/00* (2013.01)

(58) Field of Classification Search
CPC . C09J 9/005; C09J 11/08; C09J 103/02; C09J 2401/00; C09J 2403/00; C09J 9/0005
See application file for complete search history.

(56) References Cited

U.S. PATENT DOCUMENTS

| | | | |
|---|---|---|---|
| 7,955,504 B1 * | 6/2011 | Jovanovic | B01D 63/088 210/321.71 |
| 2007/0149669 A1 * | 6/2007 | Hardy | C08K 5/098 524/394 |
| 2011/0293932 A1 * | 12/2011 | Jiang | C09J 5/00 156/336 |
| 2015/0090156 A1 | 4/2015 | Combs et al. | |
| 2016/0194527 A1 | 7/2016 | Bloembergen et al. | |
| 2017/0226393 A1 | 8/2017 | Liar | |
| 2017/0283669 A1 * | 10/2017 | Lipscomb | C08F 220/1804 |

FOREIGN PATENT DOCUMENTS

| | | |
|---|---|---|
| CA | 2826831 | 8/2012 |
| EP | 1151051 | 11/2001 |
| EP | 2406324 | 1/2012 |
| EP | 3105298 | 12/2016 |
| EP | 3444310 | 2/2019 |

OTHER PUBLICATIONS

International Search Report dated Jul. 10, 2020 in corresponding PCT International Patent Application No. PCT/EP2020/060355, 5 pgs.
Written Opinion dated Jul. 10, 2020 in corresponding PCT International Patent Application No. PCT/EP2020/060355, 6 pgs.

* cited by examiner

*Primary Examiner* — Doris L Lee
(74) *Attorney, Agent, or Firm* — Ruggiero McAllister & McMahon LLC

(57) ABSTRACT

A water based glue stick composition includes adhesive and nanocrystalline cellulose. The composition is contained in a glue stick that can be used for planar joining of substrates to one another. The substrates can include paper and/or cardboard such as printer paper, photo paper and cardboard paper.

16 Claims, No Drawings

GLUE STICK COMPOSITION

CROSS REFERENCE TO RELATED APPLICATIONS

This application is a National Stage Application of International Application N°PCT/EP2020/060355, filed on Apr. 10, 2020, now published as WO/2020/212291 and which claims priority from EP19305493.9, filed on Apr. 16, 2019, the entire contents of which are incorporated herein by reference.

BACKGROUND

1. Field of the Disclosure

The present disclosure concerns glue stick with improved gluing performance, in particular by the use of additives which are not detrimental to the environment and to the health of the consumer.

Glue sticks are rod-shaped adhesives that are received slidably in a closable casing and leave behind a tacky film when rubbed off onto a substrate surface. They contain an adhesive dissolved in a liquid phase together with shape-imparting structural substance. The substance mixture is solidified in the form of a more or less rigid soap gel having a rod-like stick form which upon rubbing-off will be converted into a pasty state having a good adhesive nature.

2. Description of Related Art

Glue sticks having no negative impact on the environment are already known in the art such as in US2017/0226393. In this case starch derivatives are used as the adhesive.

However, there is still a need to improve the gluing performance of such a glue stick without impairing the environment and while maintaining an acceptable stick length.

SUMMARY OF THE DISCLOSURE

The inventors have surprisingly discovered that by the use of nanocrystalline cellulose it is possible to solve the above-mentioned problem without impairing the consistency of the composition which will hold and retain its shape. Moreover there will be less deposit of the glue stick on the paper (in g/100 m) which will allow a longer use of the glue stick for the same glue stick length than the glue stick of the prior art. In addition, the glue stick composition has more specifically a consistency which allows holding its shape and/or may prevent breakage during use.

The present disclosure therefore concerns a water based glue stick composition comprising adhesive and nanocrystalline cellulose.

For the purposes of the present disclosure, the term "water based" is intended to mean that the composition comprises water. It is more specifically intended to mean that water is the main solvent of the composition. In particular the term "main solvent" should be understood as the solvent present in the largest quantity, in particular compared to another optional additional solvent that may be also present in the glue stick composition.

According to the disclosure, the glue stick composition comprises at least 40 weight % of water, more specifically at least 48 weight %, relative to the total weight of the glue stick composition.

More specifically, the content of water ranges from 40 to 70 weight %, even more specifically from 45 to 60 weight %, even more specifically from 48 to 55 weight %, relative to the total weight of the glue stick composition.

More specifically, the glue stick composition is free of organic solvent. In particular, the glue stick composition is free of water immiscible solvent, even more specifically water immiscible organic solvent.

In the sense of the present disclosure, the expression "comprising a" should be understood as being synonymous with "comprising at least one".

In the sense of the present disclosure, the expressions "between . . . and . . . " or "ranging from . . . to . . . " should be understood as including the values of the limits.

The glue stick composition according to the present disclosure contains an adhesive which will provide the glue stick composition with its adhesive properties.

More specifically the adhesive is selected in the group consisting of starch, starch derivatives, polyvinylpyrrolidone, aqueous polyacrylates, polyvinyl alcohols and mixture thereof. Even more specifically the adhesive is selected in the group consisting of starch, starch derivatives and mixture thereof. Indeed these particular adhesives are more environmentally friendly. Still more specifically the adhesive is starch such as cereal starch (for example corn, wheat or rice starch) or tuber or root starch (for example potato, cassava or tapioca starch) or legume starch (for example pea or bean starch); more particularly it is corn starch which can be available commercially at Roquette under the trade name Tackidex 250. In an advantageous manner, the glue stick composition is free of polyvinylpyrrolidone. Starch derivatives can be dextrin and/or starch based sugar and/or starch ether such as hydroxyalkylcarboxymethyl starch (such as described in CA2826831).

More specifically, the adhesive content of the glue stick composition according to the present disclosure is in the range 15-35 weight % based on the total weight of the glue stick composition, even more specifically in the range 17-32 weight % based on the total weight of the glue stick composition, still more specifically in the range 22-27 weight % based on the total weight of the glue stick composition.

The glues stick composition also contains nanocrystalline cellulose (CNC). Cellulose is the most abundant natural polymer available on the earth and it is an important structural component of the cell wall of various plants. Apart from plants, cellulose is also present in a wide variety of living species, such as algae, fungi, bacteria, and even in some sea animals such as tunicates. Cellulose is composed of β-1,4-linked glucopyranose units that form a high-molecular-weight linear homopolymer, in which every monomer unit is corkscrewed at 180° with respect to its neighbors. The repeating unit of this natural polymer is a dimer of glucose, known as cellobiose. The degree of polymerization of cellulose can vary depending on the source and it is approximately 10,000 glucose units for wood-derived cellulose and 15,000 units for cotton-derived cellulose. Each glucopyranose unit bears three hydroxyl groups, which impart cellulose some of the characteristic properties such as hydrophilicity, chirality, biodegradability, etc., which are initiated by the high reactivity of the hydroxyl groups. The ability of these hydroxyl groups to form strong hydrogen bonds is the main reason for some other properties such as multiscale microfibrillated structure, hierarchical organization (crystalline and amorphous fractions), and highly cohesive nature. Naturally occurring bulk cellulose consists of highly ordered, crystalline regions along with some disordered (amorphous) regions in varying proportions, depending on its source. When these microfibrils are subjected to a proper combination of mechanical, chemical, and enzyme treatments, the highly crystalline regions of the cellulose microfibrils can be extracted, resulting in the formation of cellulose nanocrystals called nanocrystalline cellulose (CNCs). CNCs are stiff rod-like particles consisting of cellulose chain segments in a nearly perfect crystalline structure. Several mechanical processes, such as high-pressure homogenizations, high-intensity ultrasonic treatments, microfluidization techniques, cryocrushing, etc., have been utilized for the extraction of cellulose microfibrils. These mechanical processes produce enough shear forces to split apart the cellulose fibers along the longitudinal axis and help to extract the cellulose microfibrils. Each cellulose microfibril is devoid of chain folding and can be considered a string of cellulose crystals, linked along the microfibril by disordered or paracrystalline regions. The chemical method of converting cellulose microfibrils into CNCs is better than the mechanical methods as the former reduces energy consumption and also produces rod-like short nanocrystals with improved crystallinity. Strong acid hydrolysis is usually used for the removal of amorphous domains that are regularly distributed along the microfibrils. Strong acids can easily penetrate into the amorphous regions having a low level of order and hydrolyze them, leaving the crystalline regions unaffected.

As a consequence, more specifically the nanocrystalline cellulose according to the present disclosure is obtained by strong acid hydrolysis of cellulose (such as HCl or sulfuric acid or phosphoric acid hydrolysis), even more specifically by sulfuric acid hydrolysis of cellulose. More specifically, the nanocrystalline cellulose consists in cellulose hydrogen sulphate salt nanoparticles, in particular cellulose hydrogen sulphate sodium salt nanoparticles. Even more specifically, the nanocrystalline cellulose according to the present disclosure is not oxidized. In particular the surface charge of the nanocrystalline cellulose according to the present disclosure is not reduced by desulfation (DS) in post-treatment after sulfuric acid hydrolysis.

In a particular embodiment the source of cellulose of the nanocrystalline cellulose according to the present disclosure is a plant such as wood cotton, jute, ramie, sisal, flax, or hemp, water plants, grasses, agricultural wastes such as wheat and rice straw, sugarcane bagasse, sawdust, cotton stables, even more specifically the source of cellulose is wood or cotton, such as wood pulp or cotton fibers, still more specifically it is wood, in particular wood pulp.

In an advantageous embodiment the nanocrystalline cellulose according to the present disclosure is spindle shaped.

More specifically the nanocrystalline cellulose according to the present disclosure has a particle diameter in the range 2-8 nm, even more specifically in the range 2-5 nm, in particular in the range 2.3-4.5 nm, measured by atomic force microscopy (AFM).

In an advantageous manner, the nanocrystalline cellulose according to the present disclosure has a particle length in the range of 40-160 nm, more specifically in the range 44-108 nm, measured by atomic force microscopy.

More specifically the crystalline fraction of the nanocrystalline cellulose according to the present disclosure is 0.88 measured by X-ray powder diffraction (XRD). The nanocrystalline cellulose according to the present disclosure can be available commercially at CelluForce under the trade name CelluForce NCC.

In an advantageous embodiment, the nanocrystalline cellulose content of the glue stick composition according to the present disclosure is in the range 0.1-3 weight % based on the total weight of the glue stick composition, more specifically in the range 0.2-2 weight % based on the total weight of the glue stick composition, even more specifically in the range 0.25-1.5 weight % based on the total weight of the glue stick composition.

The water based glue stick composition according to the present disclosure can also contain additional components.

In an advantageous embodiment, the water based glue stick composition according to the present disclosure comprises at least an additional component more specifically chosen from a humectant, even more specifically selected in the group consisting of glycerin, sorbitol, aloe Vera, honey, propylene glycol, butylene glycol and mixture thereof, even more specifically selected in the group consisting of glycerin, sorbitol and mixture thereof, still more specifically it is a mixture of sorbitol and glycerin.

More specifically the humectant content of the glue stick composition according to the present disclosure is in the range 5-30 weight % based on the total weight of the glue stick composition, even more specifically in the range 10-25 weight % based on the total weight of the glue stick composition, still more specifically in the range 15-20 weight % based on the total weight of the glue stick composition.

The water based glue stick composition according to the present disclosure can also contain a soap, more specifically selected in the group consisting of sodium salt of fatty acid, even more specifically sodium salt of $C_{12}$-$C_{22}$ fatty acids, still more specifically sodium salt of $C_{14}$-$C_{18}$ fatty acids, in particular it is sodium stearate. The soap is the shape-imparting structural substance of the glue stick composition according to the present disclosure.

More specifically the soap content of the glue stick composition according to the present disclosure is in the range 1-20 weight % based on the total weight of the glue stick composition, even more specifically in the range 2-15 weight % based on the total weight of the glue stick composition, still more specifically in the range 2-5 weight based on the total weight of the glue stick composition.

The water based glue stick composition according to the present disclosure can contain other additives, more specifically selected in the group consisting of antifoam agent, preservative, perfume, pH regulators, pH indicators, lubricants, wetting agents, plasticizers, fillers, superabsorbers, coloring agents such as dyes or pigments or mixture thereof and mixture thereof, even more specifically selected in the group consisting of antifoam agent, preservative and mixture thereof, in particular in a content well known by the one skilled in the art.

More specifically the additives content of the glue stick composition according to the present disclosure is in the range 0.1-7 weight % based on the total weight of the glue stick composition, even more specifically in the range 1-5 weight % based on the total weight of the glue stick composition, still more specifically in the range 2.5-3.5 weight % based on the total weight of the glue stick composition.

In particular the glue stick composition according to the present disclosure may comprise an antifoam agent, more specifically a polysiloxane-based antifoam agent or a silica and oil blend (such as Foamaster MO2170 from BASF), and even more specifically an aqueous emulsion of modified polysiloxane (such as MOUSSEX® from Synthron, TEGO® Foamex from Evonik).

More specifically the antifoam agent content of the glue stick composition according to the present disclosure is in the range 0.5-3 weight % based on the total weight of the glue stick composition, even more specifically in the range 1-2.5 weight % based on the total weight of the glue stick composition, still more specifically in the range 1.15-2.15 weight % based on the total weight of the glue stick composition The glue stick composition according to the present disclosure may contain a preservative such as phenoxyethanol (ACTICIDE® from Thor), isothiazolinone specifically selected in the group consisting of 1,2-benzisothiazolin-3-one, 2-methyl-4-isothiazolin-3-one, and mixture thereof.

More specifically, the preservative is present in the glue stick composition according to the disclosure in an amount ranging from 0.03 to 1.5 weight %, even more specifically ranging from 0.05 to 1 weight %, relative to the total weight of the glue stick composition.

The lubricants can be polyalkylene glycol derivatives, such as polyoxyethylene lauryl ether, fatty acid alkali salts, nonionic surfactants, fluorine base surfactants such as perfluoroalkyl ether phosphoric acid esters and polyether modified silicone such as polyethylene glycol adducts of dimethylenepolysiloxane.

The filler can be mineral filler such as barium sulfate, or it can be gelatin or sucrose.

The pH regulator can be ammonia, urea, monoethanolamine, diethanolamine, triethanolamine, alkali metal salts of phosphoric acid such as tripolyphosphate, sodium carbonate and hydroxides of alkali metals such as sodium hydroxide.

The pH indicator can be thymolphthalein.

The present disclosure also concerns the glue stick containing the glue stick composition according to the present disclosure, more specifically having a rod-like stick form. In particular the length of the glue stick (8 g) is comprised between 6-7 cm. The present disclosure also concerns a casing containing the glue stick according to the present disclosure, more specifically with a cap. Even more specifically the casing is a twist or push-up tube.

It also concerns the use of a glue stick according to the present disclosure for planar joining of substrates, in particular for joining paper and/or cardboard, to one another, in particular printer paper, photo paper and cardboard paper.

It also concerns a process of preparation of the glue stick comprising the following steps:
 a—Mixing under heating below 100° C., more specifically at a temperature between 85-90° C., water, the optional humectant and/or antifoam agent, nanocrystalline cellulose, the adhesive, the soap and the optional additive such as the preservative and/or the antifoam agent;
 b—Pouring the preparation obtained in step a) into the sticks;
 c—Letting the stick cool at room temperature until solidification;
 d—Recovery of the glue stick thus obtained.

More specifically, the speed of the mixing of step a) is higher during the addition of the adhesive and the soap.

In an advantageous manner, water, the optional humectant and/or antifoam agent are first mix together before the addition of nanocrystalline cellulose under stirring. The adhesive is then added under stirring, before the addition of the soap under stirring and finally the rest of the optional additive.

The present disclosure will be understood more clearly in the light of the examples which follow, which are given in a non-limiting way.

EXAMPLE 1: PREPARATION OF A GLUE STICK ACCORDING TO THE INVENTION

Two different glue sticks have been prepared having the composition described in table 1 below

TABLE 1

|  | Formula 1 (disclosure) % by weight | Formula 2 (disclosure) % by weight | Function |
|---|---|---|---|
| Water | 51.15 | 52.40 | Solvent |
| Glycerine 4810 (glycerin) | 10.00 | 10.00 | Humectant |
| Neosorb 70/70 (sorbitol) | 7.15 | 7.15 | Humectant |
| Tackidex 250 (corn starch) | 25.50 | 24.50 | Adhesive |
| Sodium stearate | 3.00 | 3.50 | Soap |
| Celluforce NCC (nanocrystalline cellulose) | 1.00 | 0.25 | Additive |
| Foamaster MO2170 (Silica and oil blend) | 1.30 | 1.30 | Additive (antifoam agent) |
| Acticide PHE (phenoxyethanol) | 0.90 | 0.90 | Additive (preservative) |
| Total | 100.00% | 100.00% |  |

The process of preparation for the composition of formula 2 is as follow:

1st Step: Mixing (85-90° C.)

Laboratory equipment=Dissolver DISPERMAT® LC75–Dissolver disc Ø60 mm.

For a laboratory preparation of 300 g, we heat between 85-90° C. 157.2 g of water and then introduce 30 g of Glycerin 4810+21.45 g of Neosorb® 70/70 and 2.40 g of Foamaster® MO2170. We stir at 500 rpm speed during 5 min and maintain the temperature between 85-90° C.

We add under stirring 0.75 g of Cellulose NCC and maintain 500 rpm speed and the same temperature during 5 min.

We increase the stirring speed to 1000 rpm and introduce at this stage 73.50 g of TACKIDEX® 250.

We stir during 15 min and maintain the temperature at 85-90° C.

We add 10.50 g of sodium stearate and stir during 15 min without changing stirring speed and temperature.

At the end, we add 2.70 g of Acticide® PHE and 1.50 g of Foamaster® MO2170 and stir only 3 min at lower stirring speed (500 rpm).

2nd Step: Filling (80° C.)

We pour immediately the preparation into the sticks.

3rd Step: Cooling (65° C. to Room T° C.)

We let the sticks solidified at room temperature.

The same preparation process is used for preparing a glue stick of example 1 with the corresponding amount of each ingredient.

EXAMPLE 2: COMPARISON OF THE GLUING PERFORMANCES WITH A GLUE STICK NOT CONTAINING NANOCRYSTALLINE CELLULOSE

The gluing performance of the glue stick having the composition of formula 2 of example 1 according to the disclosure has been compared with the gluing performance of the glue stick having the same composition but without nanocrystalline cellulose (formula 3: comparative example out of the disclosure) and prepared as described in example 1 by the use of the following tests (Table 2).

TABLE 2

| | Formula 2 of example 1 (disclosure) % by weight | Comparative formula 3 % by weight | Function |
|---|---|---|---|
| Water | 52.40 | 52.65 | Solvent |
| Glycerine 4810 (glycerin) | 10.00 | 10.00 | Humectant |
| Neosorb 70/70 (sorbitol) | 7.15 | 7.15 | Humectant |
| Tackidex 250 (corn starch) | 24.50 | 24.50 | Adhesive |
| Sodium stearate | 3.50 | 3.50 | Soap |
| Celluforce NCC (nanocrystalline cellulose) | 0.25 | — | Additive |
| Foamaster MO2170 (Silica and oil blend) | 1.30 | 1.30 | Additive (antifoam agent) |
| Acticide PHE (phenoxyethanol) | 0.90 | 0.90 | Additive (preservative) |
| Total | 100.00% | 100.00% | |

The stick length (=total length placed) and the glue quantity used by 100 m (=weight of glue necessary to glue 100 meters of paper) have been assessed by using the following method at 23° C. and 50% RH, 7 days after manufacturing the glue stick, on 3 sticks of glue for each example:

1—The glue stick in the tube is weighted (with the cap)
2—Then the glue is placed by strips of 20 cm of Paper A4 80 g/m² of reference Navigator or equivalent (=printer paper) in order to completely empty the tube of glue.
3—The empty glue stick tube is weighted (with the cap). Steps 1 to 3 are repeated with the 2 other glue sticks and the average is calculated.

For each tested glue stick, the number of pages totally covered and the length covered on the last page is determined, in order to be able to determine the total length placed, by using the following formula:

The Total length placed (m)=Number of pages covered×1.4+length placed on the last page.

The weight of glue necessary to glue 100 meters of paper is calculated using the following formula:

$$\text{Weight of glue necessary for 100 metres of paper} = \frac{(\text{Initial weight} - \text{final weight (g)}) \times 100}{\text{Length that can be deposited (m)}}$$

The setting time (=bonding time) has been assessed by using the following method at 23° C. and 50% RH on a paper A4 80 g/m² of reference Navigator or equivalent, 7 days after manufacturing the glue stick, on 5 sticks of glue for each example:

1—On a sheet of scrap paper, make a deposit to check whether it is uniform.
2. Cut 2 strips of paper 80 g/m² of 4 cm in width and 12 cm in length, then 2 strips of paper 80 g/m² of 4 cm in width and 15 cm in length
3. On the 1st strip of paper of 15 cm, place 2 layers of glue superimposed on the center of the strip.
4. Position the 1st strip of 12 cm on the strip of 15 cm and apply pressure like a customer does when he glues 2 pieces of paper together (pressure with fingers on the assembling after glue deposit).
5. When the test specimen is produced, start the chronometer.
6. Every 5 seconds, gradually pull off the two paper strips until there is breakage between the 2 supports.

Beyond 30 seconds, perform the test every 10 seconds instead of 5 seconds.

The bonding time of a glue corresponds to the breakage between the 2 supports.

If the bonding time is greater than 2 minutes, indicate >2 minutes.

In the case where a single test specimen has not been sufficient, repeat the test using two new strips (12 and 15 cm), starting to pull off the two strips later.

7. Repeat steps 3 to 6 for the 2nd strips of paper.
8. Repeat steps 2 to 7 for the other glue stick to be tested.

The "Customer test" (=Quality of bonding of a glue stick over time Consumer Test) has been assessed by using the following method at 23° C. and 50% RH, one day and 7 days after manufacturing the glue stick (Consumer Test 1 day), or 1 week and 7 days after manufacturing the glue stick (Consumer Test 1 week) on 5 sticks of glue for each example:

The equipment consists in:
Spiral notebook 60 g/m² of reference Lyreco Budget 210×297 mm, 80 pages or equivalent
Paper A4 80 g/m² of reference Navigator or equivalent (=printer paper)
Stiff-covered paper 200 g/m² of reference Canson Mix Media Imagine or equivalent (=cardboard paper)
Photo paper 250 g/m² of reference HP Advanced or equivalent (=photo paper)
Standardized roll of 1 kg
Standardized roll of 2 kg.

The method is as follow:
1. On a sheet of scrap paper, make a deposit to check whether it is uniform.
2. Cut 8 strips of paper 80 g/m² of 4 cm in width and 12 cm in length.
3. On the 1st strip of paper, make a glue deposit (1 layer) on the center of the strip and glue it on the notebook sheet (do not glue strips on the back of notebook sheets).
4. Apply pressure with the 1 kg standardized roller (1 forward-return pass, where the glue was deposited).
5. Repeat steps 3 to 4 for the 7 other strips of 80 g/m² paper.
6. Immediately close the notebook after gluing.
7. Repeat steps 2 to 6 for the other supports to be tested and for the other products to be tested.
8. Store the notebook in an air-conditioned room at 23° C./50% RH.
9. After 1 h of test, and for each paper support to be tested, pull the first paper strip to determine the type of adherence encountered during tear-off. This test corresponds to the ageing interval T0.
10. Repeat step 9 for the next 7 bands, after each ageing interval.
11. Repeat steps 1 to 10 with the 2 kg standardized roller and with applying pressure like a customer does when he glues 2 pieces of paper together (pressure with fingers on the assembling after glue deposit=consumer usage).

The scoring obtained is as follow:
10: The paper strip has fully adhered to the notebook sheet—The support breaks;
7.5: The paper strip has partially adhered to the notebook sheet—The support partially breaks;
5: The paper strip adheres slightly to the notebook sheet—The support partially does not tear;

2.5: The paper strip adheres very slightly to the notebook sheet—The support does not tear and slight resistance is felt—Cohesive break 0: The paper strip does not adhere at all to the notebook sheet—The support does not tear—Cohesive break The results are indicated in table 3 below:

TABLE 3

|  |  |  | Formula 2 of example 1 | Comparative formula 3 |
|---|---|---|---|---|
|  | Stick length (m) |  | 45.6 | 34.6 |
|  | Glue quantity used by 100 m (g/100 m) |  | 16.0 | 20.4 |
| Setting time (s) |  | Consumer usage | 50 | 55 |
| Consumer Test 1 day | Roll (1 kg) | Printer paper | 5 | 5 |
|  |  | Photo paper | 7.5 | 7.5 |
|  |  | Cardboard paper | 2.5 | 2.5 |
|  | Roll (2 kg) | Printer paper | 10 | 7.5 |
|  |  | Photo paper | 10 | 10 |
|  |  | Cardboard paper | 7.5 | 5 |
|  | Consumer usage | Printer paper | 10 | 10 |
|  |  | Photo paper | 10 | 10 |
|  |  | Cardboard paper | 10 | 7.5 |
| Consumer Test 1 week | Roll (1 kg) | Printer paper | 10 | 2.5 |
|  |  | Photo paper | 7.5 | 5 |
|  |  | Cardboard paper | 2.5 | 0 |
|  | Roll (2 kg) | Printer paper | 10 | 10 |
|  |  | Photo paper | 10 | 10 |
|  |  | Cardboard paper | 7.5 | 7.5 |
|  | Consumer usage | Printer paper | 10 | 10 |
|  |  | Photo paper | 10 | 10 |
|  |  | Cardboard paper | 10 | 2.5 |

Cardboard paper and photo paper are known to be more difficult to glue. It should be noted that the results obtained with the roll of 2 kg is close to the results obtained with the fingers (the roll of 1 kg is lighter than the fingers). As shown in table 3, the glue stick according to the present disclosure (formula 2) shows better results in term of stick length, glue quantity used by 100 m and consumer tests, in particular after 1 week and on cardboard paper.

Therefore the gluing performance of a glue stick containing the nanocrystalline cellulose is better than the gluing performance of a glue stick not containing nanocrystalline cellulose.

EXAMPLE 3: COMPARISON OF THE GLUING PERFORMANCES WITH COMPARATIVES GLUE STICK FORMULATIONS NOT CONTAINING NANOCRYSTALLINE CELLULOSE

The gluing performance of the glue stick having the composition of formula 1 of example 1 (disclosure) has been compared with the gluing performance of comparative formula 4 (comparative example) and of comparative formula 5 (comparative example) having the composition indicated in the following tables 4 and 5.

TABLE 4

|  | Formula 4 (comparative example) | Function |
|---|---|---|
| Water | 53.4 | Solvent |
| Glycerin | 8.0 | Humectant |
| Monopropylene glycol | 0.6 | Humectant |
| Starch | 28.0 | Adhesive |
| Sodium stearate | 10.0 | soap |
| Total | 100.00% |  |

TABLE 5

|  | Formula 5 (comparative example) | Function |
|---|---|---|
| Water | 46.0 | Solvent |
| Polyvinyl pyrrolidone | 22.0 | Adhesive |
| Sodium stearate | 7.00 | soap |
| Glycerin | 11.0 | Humectant |
| Propylene glycol | 4.0 | Humectant |
| Other | 10.0 | Biocide, perfume |
| Total | 100.00% |  |

Each glue stick has been tested on 3 different types of paper (Printer paper 80 g/m$^2$, Canson paper 200 g/m$^2$ (cardboard paper) and Photo paper 250 g/m$^2$) by making for each type of paper, a glue deposit on one side of the paper and add another paper on the glue deposit and then apply pressure with the 1 kg standardized roller (4 forward-return pass, where the glue was deposited). Peeling tests have been performed on each glued papers at 23° C. and 50% RH at 180° with a speed of 300 mm/min using the Standard method Finat FTM 1: peel adhesion (180°) at 300 per minute until the tearing of the paper according to the following method:

The unglue side of the papers is fixed on a metal plate engaged in the top jaw of the tensile apparatus. An extension is added to the leading edge (end of the glued paper). It is engaged in the lower jaw.

The evolution of the peeling linear load is drawn as a function of the shift.

The failure mode is identified (adhesive, cohesive, tearing of the paper . . . )

Tests specimen dimension are 25 mm×175 mm in machine direction.

The results are indicated in table 6 below:

TABLE 6

| References | Printer paper 80 g/m$^2$ | Canson paper 200 g/m$^2$ (cardboard paper) | Photo paper 250 g/m$^2$ |
|---|---|---|---|
| Formula 4 (comparative example) | 85 (+/−20) N/m | 70 (+/−30) N/m | 90 (+/−20) N/m |
| Formula 5 (comparative example) | <40 N/m | <20 N/m | Null |

TABLE 6-continued

| References | Printer paper 80 g/m² | Canson paper 200 g/m² (cardboard paper) | Photo paper 250 g/m² |
| --- | --- | --- | --- |
| Formula 1 (disclosure) | 105 (+/−20) N/m | 100 (+/−15) N/m | 100 (+/−20) N/m |

The adhesion degree is higher for the glue stick according to the present disclosure (formula 1) whatever the type of paper used.

EXAMPLE 4: PREPARATION OF A COMPARATIVE GLUE STICK COMPOSITION

The gluing performance of the glue stick having the composition of formula 2 of example 1 (disclosure) has been compared with the gluing performance of comparative formula 6 (comparative example) having the composition indicated in the following table 7, and wherein the nanocrystalline cellulose has been replaced weight by weight by sodium carboxymethylcellulose.

TABLE 7

|  | Formula 2 of example 1 (invention) % by weight | Comparative Formula 6 % by weight |
| --- | --- | --- |
| Water | 52.40 | 52.40 |
| Glycerine 4810 (glycerin) | 10.00 | 10.00 |
| Neosorb 70/70 (sorbitol) | 7.15 | 7.15 |
| Tackidex 250 (corn starch) | 24.50 | 24.50 |
| Sodium stearate | 3.50 | 3.50 |
| Celluforce NCC (nanocrystalline cellulose) | 0.25 |  |
| Sodium Carboxymethylcellulose (Blanose™ REF CMC 7ULC by Ashland) |  | 0.25 |
| Foamaster MO2170 (Silica and oil blend) | 1.30 | 1.30 |
| Acticide PHE (phenoxyethanol) | 0.90 | 0.90 |
| Total | 100.00% | 100.00% |

The process of preparation for the composition of example 6 (comparative example) is as follow:

1st Step: Mixing (85-90° C.)

Laboratory equipment=Dissolver DISPERMAT® LC75–Dissolver disc Ø60 mm.

For a laboratory preparation of 300 g, we heat between 85-90° C. 157.2 g of water and then introduce 30 g of Glycerin 4810+21.45 g of Neosorb® 70/70 and 2.40 g of Foamaster® MO2170. We stir at 500 rpm speed during 5 min and maintain the temperature between 85-90° C.

We add under stirring 0.75 g of Blanose™ REF CMC 7ULC by Ashland and maintain 500 rpm speed and the same temperature during 5 min.

We increase the stirring speed to 1000 rpm and introduce at this stage 73.50 g of TACKIDEX® 250.

We stir during 15 min and maintain the temperature at 85-90° C.

We add 10.50 g of sodium stearate and stir during 15 min without changing stirring speed and temperature.

At the end, we add 2.70 g of Acticide® PHE and 1.50 g of Foamaster® MO2170 and stir only 3 min at lower stirring speed (500 rpm).

2nd Step: Filling (80° C.)

We pour immediately the preparation into the sticks.

3rd Step: Cooling (65° C. to Room T° C.)

We let the sticks solidified at room temperature.

EXAMPLE 5: COMPARISON OF THE GLUING PERFORMANCES WITH COMPARATIVE GLUE STICK COMPOSITIONS CONTAINING SODIUM CARBOXYMETHYLCELLULOSE

The gluing performance of the glue stick having the composition of formula 2 of example 1 (disclosure) has been compared with the gluing performance of the glue sticks wherein the nanocrystalline cellulose has been replaced weight by weight by sodium carboxymethylcellulose (Formula 6) by the use of the following tests:

The stick length (=total length placed) and the glue quantity used by 100 m (=weight of glue necessary to glue 100 meters of paper) have been assessed by using the following method at 23° C. and 50% RH, 7 days after manufacturing the glue stick, on 3 sticks of glue for each example:

1—The glue stick in the tube is weighted (with the cap)
2—Then the glue is placed by strips of 20 cm of Paper A4 80 g/m² of reference Navigator or equivalent (=printer paper) in order to completely empty the tube of glue.
3—The empty glue stick tube is weighted (with the cap).

Steps 1 to 3 are repeated with the 2 other glue sticks and the average is calculated.

For each tested glue stick, the number of pages totally covered and the length covered on the last page is determined, in order to be able to determine the total length placed, by using the following formula:

The Total length placed (m)=Number of pages covered×1.4+length placed on the last page.

The weight of glue necessary to glue 100 meters of paper is calculated using the following formula:

$$\text{Weight of glue necessary for 100 metres of paper} = \frac{(\text{Initial weight} - \text{final weight (g)}) \times 100}{\text{Length that can be deposited (m)}}$$

The "Customer test" (=Quality of bonding of a glue stick over time Consumer Test) has been assessed by using the following method at 23° C. and 50% RH, 1 week and 7 days after manufacturing the glue stick (Consumer Test 1 week) on 5 sticks of glue for each example:

The equipment consists in:
Spiral notebook 60 g/m² of reference Lyreco Budget 210×297 mm, 80 pages or equivalent
Paper A4 80 g/m² of reference Navigator or equivalent (=printer paper)

Photo paper 250 g/m² of reference HP Advanced or equivalent (=photo paper)
Standardized roll of 1 kg
Standardized roll of 2 kg.
The method is as follow:
1. On a sheet of scrap paper, make a deposit to check whether it is uniform.
2. Cut 8 strips of paper 80 g/m² of 4 cm in width and 12 cm in length.
3. On the 1st strip of paper, make a glue deposit (1 layer) on the center of the strip and glue it on the notebook sheet (do not glue strips on the back of notebook sheets).
4. Apply pressure with the 1 kg standardized roller (1 forward-return pass, where the glue was deposited).
5. Repeat steps 3 to 4 for the 7 other strips of 80 g/m² paper.
6. Immediately close the notebook after gluing.
7. Repeat steps 2 to 6 for the other supports to be tested and for the other products to be tested.
8. Store the notebook in an air-conditioned room at 23° C./50% RH.
9. After 1 h of test, and for each paper support to be tested, pull the first paper strip to determine the type of adherence encountered during tear-off. This test corresponds to the ageing interval T0.
10. Repeat step 9 for the next 7 bands, after each ageing interval.
11. Repeat steps 1 to 10 with the 2 kg standardized roller and with applying pressure like a customer does when he glues 2 pieces of paper together (pressure with fingers on the assembling after glue deposit=consumer usage).

The scoring obtained is as follow:
10: The paper strip has fully adhered to the notebook sheet—The support breaks;
7.5: The paper strip has partially adhered to the notebook sheet—The support partially breaks;
5: The paper strip adheres slightly to the notebook sheet—The support partially does not tear;
2.5: The paper strip adheres very slightly to the notebook sheet—The support does not tear and slight resistance is felt—Cohesive break
0: The paper strip does not adhere at all to the notebook sheet—The support does not tear—Cohesive break The results are indicated in table 8 below:

TABLE 8 comparison of the gluing performances of the glue stick composition of the disclosure (Formula 2 of example 1) with the comparative glue stick compositions (formula 6)

| | | | Formula 2 of example 1 (disclosure) | Comparative formula 6 |
|---|---|---|---|---|
| Stick length (m) | | | 45.6 | 10.40 |
| Glue quantity used by 100 m (g/100 m) | | | 16.0 | 61.83 |
| Consumer Test 1 week | Roll (1 kg) | Printer paper | 10 | 5 |
| | | Photo paper | 7.5 | 0 |
| | Roll (2 kg) | Printer paper | 10 | 10 |
| | | Photo paper | 10 | 2.5 |
| | Consumer usage | Photo paper | 10 | 0 |

As shown in Table 8, the glue stick composition according to the present disclosure (formula 2 of example 1) exhibits good results in term of stick length (m), as well as in term of glue quantity used by 100 m and consumer tests after 1 week on printed paper or photo paper than the comparative formula 6.

Besides, it is observed that the glue stick composition according to the disclosure (formula 2 of example 1) has an appropriate consistency which allows holding its shape.

It can be noted that the paper strip does not adhere efficiently with the glue deposits made, with the comparative glue compositions of formula 6 with the apply pressure of 1 kg of standardized roll, as well as with 2 kg of standardized roll, on printer paper or on photo paper, in particular when compared with the glue deposit made with the composition of formula 2 of example 1 according to the disclosure, which can be fully adhered to these supports.

Besides, the comparative glue composition of formula 6 doesn't have an appropriate consistency. Hence, the texture of this glue stick composition is too soft to be applied properly on the support (the stick is not rigid enough), which causes an important deposit. As shown in Table 8, the glue quantity used by 100 m with the comparative glue composition of formula 6 is very high (glue quantity: 61.83 g/100 m) compared to the glue quantity used by 100 m with the glue composition of formula 2 of example 1 according to the present disclosure (glue quantity: 16.0 g/100 m).

Therefore, a glue stick according to the disclosure containing the nanocrystalline cellulose exhibit enhances performances than a comparative glue stick containing sodium carboxymethylcellulose (formula 6).

The invention claimed is:

1. A water based glue stick composition, the composition comprising:
water in a range of 40-70 weight % based on the total weight of the glue stick composition;
an adhesive selected from the group consisting of starch, starch derivatives, and a mixture thereof,
wherein the adhesive is in a range of 15-35 weight % based on the total weight of the glue stick composition; and
an additive of nanocrystalline cellulose mixed with the adhesive,
wherein the nanocrystalline cellulose content is in the range 0.1-1.5 weight % based on the total weight of the composition,
wherein the nanocrystalline cellulose in the composition has a particle length in the range of 40-160 nm, measured by atomic force microscopy, and
wherein the composition is solidified.

2. The composition according to claim 1, wherein the nanocrystalline cellulose consists of cellulose hydrogen sulphate salt nanoparticles.

3. The composition according to claim 1, wherein the nanocrystalline cellulose consists of cellulose sulphate sodium salt nanoparticles.

4. The composition according to claim 1, wherein the nanocrystalline cellulose has a particle diameter in the range 2-8 nm, measured by atomic force microscopy.

5. The composition according to claim 1, wherein the nanocrystalline cellulose has a particle diameter in the range 2-5 nm, measured by atomic force microscopy.

6. The composition according to claim 1, wherein the nanocrystalline cellulose has a particle length in the range of 44-108 nm, measured by atomic force microscopy.

7. The composition according to claim 1, wherein the nanocrystalline cellulose content is in the range 0.2-0.25 weight % based on the total weight of the composition.

8. The composition according to claim 1, wherein the nanocrystalline cellulose content is in the range 0.25-1.5 weight % based on the total weight of the composition.

9. The composition according to claim 1, wherein the adhesive content is in the range 17-32 weight % based on the total weight of the composition.

10. The composition according to claim 1, further comprising: an additive.

11. The composition according to claim 1, further comprising: a glycerin and/or sorbitol in the range 5-30 weight % based on the total weight of the composition.

12. The composition according claim 11, wherein the glycerin and/or sorbitol content is in the range 15-17.5 weight % based on the total weight of the composition.

13. The composition according to claim 12, further comprising: a soap that consists of a sodium salt of fatty acid in the range 1-5 weight % based on the total weight of the composition.

14. The composition according to claim 12, further comprising: a soap that consists of a sodium stearate in the range 1-5 weight % based on the total weight of the composition.

15. A glue stick, the glue stick comprising:
water in a range of 48-55 weight % based on the total weight of the glue stick composition;
an adhesive selected from the group consisting of starch, starch derivatives, and a mixture thereof,
wherein the adhesive is in a range of 15-35 weight % based on the total weight of the glue stick composition;
a nanocrystalline cellulose additive,
wherein the nanocrystalline cellulose additive has a particle length in the range of 40-160 nm, measured by atomic force microscopy, and
wherein the nanocrystalline cellulose content is in the range 0.1-1.5 weight % based on the total weight of the composition;
glycerin and/or sorbitol in a range of 10-17.15 weight % based on the total weight of the glue stick composition;
sodium stearate in a range of 1-5 weight % based on the total weight of the glue stick composition;
an antifoam agent in a range of 1.15-2.15 weight % based on the total weight of the glue stick composition; and
a preservative in a range of 0.05-1 weight % based on the total weight of the glue stick composition.

16. A glue stick, the glue stick comprising:
water in a range of 40-70 weight % based on the total weight of the glue stick composition;
an adhesive selected from the group consisting of starch, starch derivatives, and a mixture thereof,
wherein the adhesive is in a range of 15-35 weight % based on the total weight of the glue stick composition; and
an additive of nanocrystalline cellulose mixed with the adhesive,
wherein the nanocrystalline cellulose content is in the range 0.1-1.5 weight % based on the total weight of the composition, and
wherein the nanocrystalline cellulose in the composition has a particle length in the range of 40-160 nm, measured by atomic force microscopy.

* * * * *